United States Patent
Guenther (10) Patent No.: US 6,547,550 B1
(45) Date of Patent: Apr. 15, 2003

(54) APPARATUS FOR HOT VACUUM EXTRUSION OF CERAMICS

(76) Inventor: Ross Guenther, P.O. Box 1320, Pollock Pines, CA (US) 95726

(*) Notice: Subject to any disclaimer, the term of this patent is extended or adjusted under 35 U.S.C. 154(b) by 0 days.

(21) Appl. No.: 09/596,271

(22) Filed: Jun. 16, 2000

(51) Int. Cl.⁷ .............................................. B29C 47/54
(52) U.S. Cl. ........................ 425/73; 419/60; 419/67; 425/79; 425/376.1; 425/405.1
(58) Field of Search .................. 425/73, 79, 376.1, 425/405.1, 405.2; 72/271, 272, 273; 419/60, 67

(56) References Cited

U.S. PATENT DOCUMENTS

| | | |
|---|---|---|
| 1,904,568 A | 4/1933 | Taylor |
| 1,918,064 A | 7/1933 | Taylor |
| 2,028,240 A | 1/1936 | Palmer |
| 2,414,029 A | 1/1947 | Duncan |
| 2,783,499 A * | 3/1957 | Billen ...................... 425/376.1 |
| 2,805,445 A * | 9/1957 | Billen ...................... 425/376.1 |
| 2,807,082 A | 9/1957 | Zambrow et al. |
| 2,818,339 A | 12/1957 | Dodds |
| 2,902,364 A | 9/1959 | Deutsch |
| 2,902,714 A | 9/1959 | Johnson |
| 2,964,400 A | 12/1960 | Brennan |
| 2,967,613 A | 1/1961 | Ellis et al. |
| 3,143,413 A | 8/1964 | Krapf |
| 3,177,077 A | 4/1965 | Eyraud et al. |
| 3,258,514 A | 6/1966 | Roach |
| 3,278,301 A | 10/1966 | Solomir et al. |
| 3,816,586 A | 6/1974 | Goosey |
| 3,827,892 A | 8/1974 | McCauley |
| 4,050,142 A | 9/1977 | Takahashi et al. |
| 4,217,140 A * | 8/1980 | Waldhuter et al. ............ 425/79 |
| 4,647,426 A | 3/1987 | Fiorentino |
| 4,785,574 A * | 11/1988 | Fiorentino ................... 425/79 |
| 4,963,709 A | 10/1990 | Kimrey, Jr. |
| 5,043,120 A | 8/1991 | Corrigan |
| 5,297,480 A | 3/1994 | Miyashita et al. |

* cited by examiner

Primary Examiner—Jan H. Silbaugh
Assistant Examiner—Joseph Leyson
(74) Attorney, Agent, or Firm—Bernhard Kreten (57) ABSTRACT

This specification discloses a method and apparatus for forming and extruding ceramic materials. The apparatus utilizes a vacuum chamber mounted within a heating chamber or element; and the ceramic forming chamber is mounted within the vacuum chamber. A press is slidably mounted within vacuum and forming chambers in order to apply pressure to the ceramic materials during the heating step and subsequently during the ceramics extrusion step. The heating chamber applies heat to the vacuum chamber and forming chamber during the sintering and extrusion step. The forming chamber preferably remains in position within the vacuum chamber during the entire ceramic article manufacturing process.

12 Claims, 8 Drawing Sheets

APPARATUS FOR HOT VACUUM EXTRUSION OF CERAMICS

FIELD OF THE INVENTION

The present invention relates to a method and apparatus for manufacturing ceramic articles. More particularly, this invention relates to an improved method and apparatus for vacuum forming, compressing, heating, and extruding ceramic articles of manufacture.

BACKGROUND OF THE INVENTION

The ceramics manufacturing industry has long sought to develop more efficient and economical methods and apparatus for the manufacture of ceramic articles from ceramic components such as ceramic particles or powders, clay, etc. Examples of prior art in the field include the following U.S. Patents:

| INVENTOR | ISSUE DATE | U.S. Pat. No. |
| --- | --- | --- |
| Taylor | Apr. 18, 1933 | 1,904,568 |
| Taylor | Jul. 11, 1933 | 1,918,064 |
| Palmer | Jan. 21, 1936 | 2,028,240 |
| Duncan | Jan. 7, 1947 | 2,414,029 |
| Zambrow, et al. | Sep. 24, 1957 | 2,807,082 |
| Dodds | Dec. 31, 1957 | 2,818,339 |
| Deutsch | Sep. 1, 1959 | 2,902,364 |
| Johnson | Sep. 8, 1959 | 2,902,714 |
| Brennan | Dec. 13, 1960 | 2,964,400 |
| Ellis, et al. | Jan. 10, 1961 | 2,967,613 |
| Krapf | Aug. 4, 1964 | 3,143,413 |
| Eyraud, et al. | Apr. 6, 1965 | 3,177,077 |
| Roach | Jun. 28, 1966 | 3,258,514 |
| Solomir, et al. | Oct. 11, 1966 | 3,278,301 |
| Goosey | Jun. 11, 1974 | 3,816,586 |
| McCauley | Aug. 6, 1974 | 3,827,892 |
| Takahashi, et al. | Sep. 27, 1977 | 4,050,142 |
| Fiorentino | Mar. 3, 1987 | 4,647,426 |
| Kimrey, Jr. | Oct. 16, 1990 | 4,963,709 |
| Corrigan | Aug. 27, 1991 | 5,043,120 |
| Miyashita, et al. | Mar. 29, 1994 | 5,297,480 |

Many ceramic articles are produced by forming the articles from a wet plastic clay and then slowly heating the formed clay articles for hours or days. This process is cumbersome, time consuming, and costly.

The heating, or sintering, step involves the welding together and growth of contact area between two or more initially distinct particles at elevated temperatures (typically above one-half of, yet below, the melting point). It has long been known that sintering of ceramic powders is enhanced by compressing or compacting the ceramic powder. Compacting is generally done at room temperature, and the resulting compacted powder is subsequently sintered at elevated temperatures.

For example, the patent to Fiorentino teaches the production of billet and extruded products from particulate materials such as ceramics. In the Fiorentino patent, a method and apparatus is disclosed for consolidating particulate materials in press equipment utilizing a reusable canister sealed in a vacuum from the atmosphere and heated in the press equipment at elevated temperatures and pressures.

Use of such canisters, however, is expensive, time consuming, and labor intensive. The canister must be packed with ceramic powder, sealed and usually pressed in a vacuum, placed in an oven or furnace, then heated, and then opened to remove the article. The process thus requires a variety of steps that are labor intensive or require substantial automation equipment. The process is also time consuming.

Other prior art processes have been developed in order to compact or press the ceramic powders at elevated temperatures and therefore simultaneously press and heat the powder. See, e.g., McGraw-Hill, Encyclopedia of Science and Technology, pp.1764–65 ($4^{th}$ Ed. 1998). Typically, however, these prior art hot pressing processes utilize an expensive, bulky vacuum housing or chamber containing the oven or furnace and pressing apparatus.

Another problem with such prior art processes is that they typically do not achieve the level of vitrification (glass bonding) of materials in the ceramic article being manufactured, particularly at the outer surface of the ceramic article being manufactured where enhanced vitrification is most desirable. Attaining such vitrification with the prior art methods such as hot pressing thus typically would require additional or extended heating of the article being hot pressed, which not only involves additional time and processing steps but also can conflict with the amount of time desired to attain the desired overall ceramic article properties achieved by the basic sintering process that takes place in the entire heating process.

The other prior art listed above but not specifically described further catalog the prior art of which the applicant is aware. These references diverge even more starkly from the references specifically distinguished above.

BRIEF SUMMARY OF THE INVENTION

The applicant has invented an apparatus and method forming ceramic articles from ceramic components, preferably ceramic powders. The method includes the following steps with the following apparatus: depositing ceramic components into a forming chamber mounted within a heating chamber; drawing a vacuum within and heating the forming chamber; opening an extrusion end of the ceramic forming chamber; and extruding the fused ceramic article through the extrusion end of the forming chamber.

Preferably, the method also includes pressing the ceramic components during the vacuum drawing and heating step. In addition, the heating chamber preferably continues to heat the forming chamber and its extrusion end during the extrusion step.

In a preferred embodiment, the vacuum is drawn by a vacuum chamber mounted within the heating chamber to surround the forming chamber. Also, the pressing step is preferably performed with a press mounted within a contractible bellows section of the vacuum chamber, and preferably the press is slidable within the forming chamber.

In a particularly preferred embodiment, the extrusion end of the forming chamber has a configuration and is heated sufficiently so that the periphery of the ceramic article is compressed and/or vitrified and/or further vitrified by the interaction of the ceramic article passing through the heated extrusion end. Most preferably, the forming chamber is not removed from the heating or vacuum chambers during the entire process.

There are other aspects and alternative or preferred embodiments of the invention. They will become apparent as the specification proceeds.

OBJECTS OF THE INVENTION

Accordingly, a primary object of the present invention is to provide a new and novel method and apparatus for hot vacuum extrusion of ceramics.

A further object of the present invention is to provide a device as characterized above which lends itself to mass production techniques.

Viewed from a first vantage point it is an object of the present invention to provide an apparatus for extrusion manufacturing ceramic articles from ceramic component materials, the a apparatus comprising in combination: a heating element; a vacuum chamber having an openable sealing member and being mounted adjacent the heating element whereby the heating element may heat the vacuum chamber; a ceramic forming chamber mounted adjacent the heat chamber and within the vacuum chamber, the ceramic forming chamber having an extrusion member; and a ceramic press movably penetrating ceramic extrusion chamber whereby ceramic component materials may be heated and pressed within the ceramic forming chamber and extruded out of the ceramic extrusion chamber through the extrusion member and the openable sealing member in the vacuum chamber.

Viewed from a second vantage point it is an object of the present invention to provide an apparatus for extrusion manufacturing ceramic articles from particulate ceramic components, the apparatus comprising in combination: a heating chamber; a vacuum chamber having being mounted within the heating chamber whereby the heating chamber may surround and heat a substantial portion of the vacuum chamber; a ceramic forming chamber having a press end opposite an extrusion end and an axial length spanning between the press end and the extrusion end, the ceramic extrusion chamber being mounted within and enclosed by the vacuum chamber so that the axial length of the ceramic forming chamber is surrounded by the heating element; and a ceramic press slidably penetrating the press end of the ceramic forming chamber whereby the particulate ceramic components may be heated and fused within the confines of the ceramic forming chamber and, after opening of the extrusion end of the ceramic forming chamber, extruded out of the ceramic forming chamber through the extrusion end and the vacuum chamber.

Viewed from a third vantage point it is an object of the present invention to provide a method of forming and extruding ceramic articles from ceramic component materials, the method comprising the steps of: depositing ceramic component materials in a ceramic forming chamber within a heating chamber; heating the ceramic forming chamber with the heating chamber and drawing a vacuum within the ceramic forming chamber in order to fuse and form the ceramic components materials; opening an extrusion end of the ceramic forming chamber without removing the ceramic forming chamber from the heating chamber; and extruding the fused and formed ceramic component materials through the extrusion end of the forming chamber.

Viewed from a fourth vantage point it is an object of the present invention to provide a method of heating, pressing, forming, and extruding ceramic articles of manufacture from ceramic components, the method comprising the steps of: depositing ceramic components into a forming chamber fixedly mounted within a vacuum chamber; drawing a vacuum within the vacuum chamber; pressing the ceramic components with a press slidably penetrating the forming chamber, and heating the vacuum chamber, the forming chamber, and the ceramic components with a heater assembly mounted externally to the vacuum chamber, whereby the ceramic components become fused within the forming chamber into a ceramic article; opening an extrusion end of the ceramic forming chamber while the forming chamber remains fixedly mounted within the vacuum chamber; extruding the fused ceramic article from the vacuum chamber by pressing the ceramic article with the sidable press so that the ceramic article extrudes through the extrusion end of the ceramic forming chamber.

These and other objects will be made manifest when considering the following detailed specification when taken in conjunction with the appended drawing figures. It is to be understood that the scope of the invention is to be determined by the claims and not by whether any given subject matter achieves all objects stated herein.

BRIEF DESCRIPTION OF THE DRAWINGS

The applicant's preferred method and apparatus are shown in the accompanying drawings wherein.

DESCRIPTION OF PREFERRED EMBODIMENTS

Figure 1:
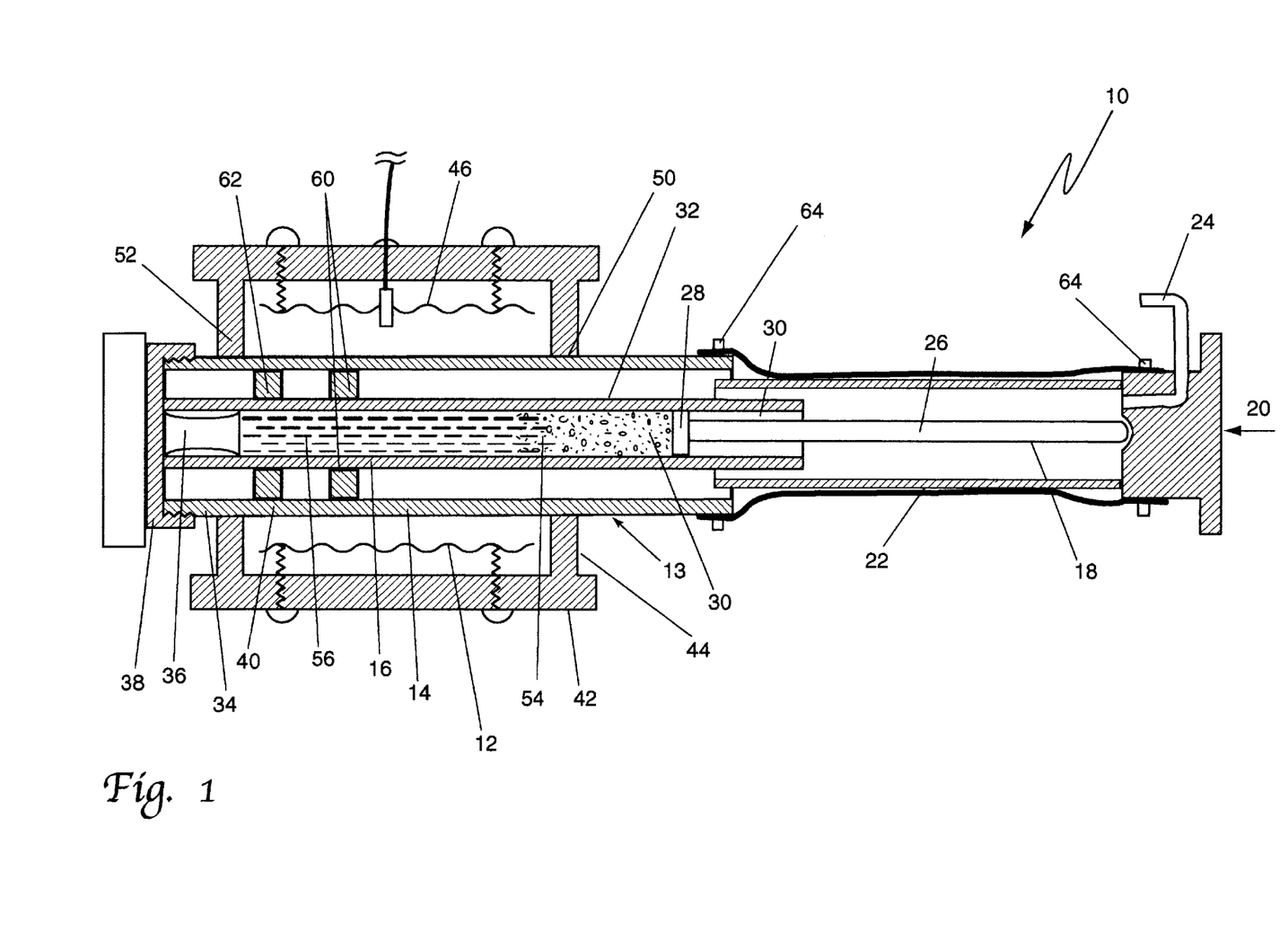
FIG. 1 is a cross-sectional schematic view of the applicant's preferred hot vacuum extrusion apparatus.

With reference now to FIG. 1, one embodiment of the applicant's preferred hot vacuum extrusion apparatus, generally 10, has an electric heating chamber or kiln having a heating element 12 surrounding a heating section 13 in a vacuum chamber 14, which in turn encompasses a forming chamber 16 and a slidable press 18 within the forming chamber 16. With reference to FIG. 1, the forming chamber 16 is centered and secured in position within the vacuum chamber 14 by metal spacers, e.g., 60, 62, mounted between the vacuum chamber 14 and forming chamber 16 at opposing ends of the forming chamber 16. Alternatively, the vacuum chamber 14 and the forming chamber 16 could be of one solid piece. The temperature of the heating chamber 12 is adjustable in a fashion such as described in connection with FIGS. 2 and 4 below.

A press or ram section 20 in the vacuum chamber 14 extends from the heating section 13. The press section 20 consists of a vacuum bellows section 22 in which the slidable press 18 is slidably mounted so that the press 18 and bellows section 22 can move in concert while maintaining a vacuum at desired level within the vacuum chamber 14 when drawn through the vacuum hose 24 by conventional vacuum drawing apparatus.

The press 18 has a press arm 26 connected to a transverse press face 28 that slidably penetrates and spans the width of, and slidably and sealingly abuts, the interior 30 of the pressing end 32 of the forming chamber 16. The slidable press or ram 18 is driven by a conventional press drive so that pressure applied by the press 18 on the ceramic contents of the forming chamber 16 can be adjusted and maintained as desired.

The forming chamber 16 has a fixed extrusion end or tool 34 opposite the pressing end 32. The extrusion end 34 is removable and replaceable and has an extrusion aperture (not shown) having any of a number of desired shapes for the article to be extruded through the aperture. The aperture is sealed when desired by a platform seal 36 that abuts the external face of the extrusion end 34. The platform seal 36 is removably secured in position by a clamp 38 attached to the platform seal 36. The clamp 38 may, for example, be threaded onto the external periphery 40 of the vacuum chamber or housing 14 in order to sealingly secure the platform seal 36 against the extrusion end 34 when desired (such as prior to the ceramic article extrusion step described below).

The heating chamber or element 12 is surrounded on its external periphery 42 by conventional insulating material 44. The interior periphery 46 of the heating chamber 12 is also spaced from the external periphery 40 of the vacuum chamber 14 by insulation spacers, e.g., 50, 52, mounted at opposing ends of the heating chamber 12.

Preferably, the press arm 26 is tubular and the press face 28 includes an aperture (not shown) so that ceramic components (such as ceramic powders) 54 may be deposited into the forming chamber 16 through the tubular press arm 26 and aperture extending through the press face 28 into the interior 56 of the forming chamber 16. The aperture in the press face 28 may be closed or sealed so that the press face 28 presents a unitary pressing surface toward the ceramic components 54 within the forming chamber 16. This closure or sealing of the press face may by accomplished by, for example, rotating one portion of the press face 28 with respect to another portion of the press face 28 secured in position by interaction of the press face 28 with the interior 30 of the forming chamber 16.

Alternatively, the press arm 26 and press face 28 may be comprised of solid and rigid components. In this embodiment, the ceramic components 54 may be deposited within the forming chamber 16 through the extrusion end 34 by loosening and tightening of the clamp 38 sufficient to allow loosening and removal and replacement of the platform seal 36 as desired to make the deposit into the forming chamber 16.

The press 18, vacuum chamber 14, forming chamber 16, sealing platform 36, clamp 38, and forming chamber spacers 60, 62 are preferably made of iron, stainless steel, or other high temperature alloys. Spacers 60, 62 may be located anywhere along the length between chambers 14 and 16 or at one end, cantilevering chamber 16, as shown. The bellows section 22, however, also includes sealed joints, e.g., 64, having seals made of flexible, resilient materials sufficient to provide the flexibility required at the joints 64 while maintaining the desired seal at the joints 64.

The ceramic components 54 to be deposited into the forming chamber 16 are preferably of the type that are ductile at high temperatures and pressures, such as muscovite mica and certain clays that reach adequate vitrification (when desired) at the temperatures and pressures used. In the case of certain gold bearing muscovite mica schists, the gold is preferably first extracted by commonly used methods such as by screening, gravity extraction, cyanide extraction, or other common methods without otherwise significantly changing the composition of the mica. In this regard, the mica or clay may contain a significant amount of other minerals, even as much as 40% or more, and still make a desirable ceramic product with the present apparatus and method.

Figure 2:
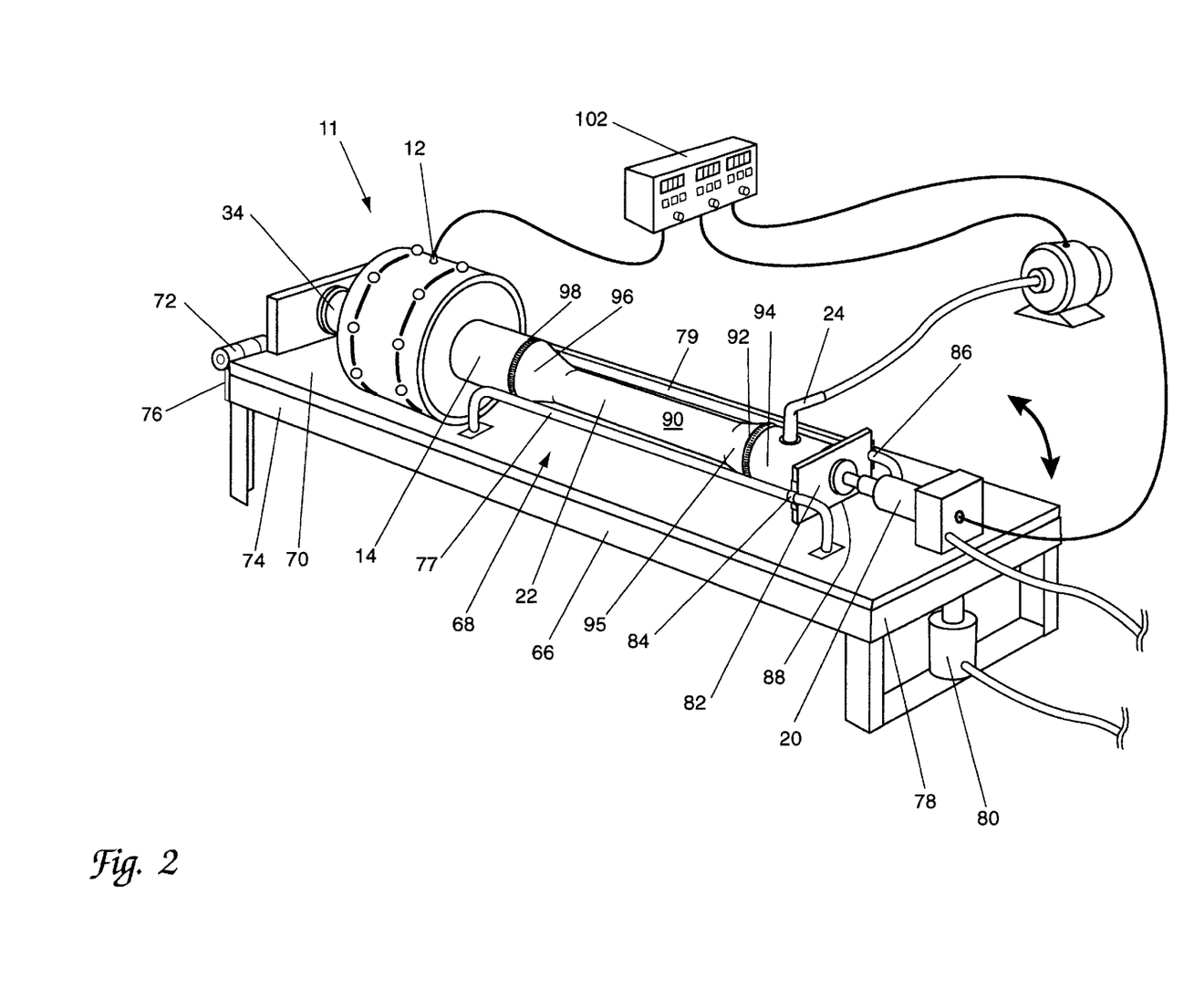
FIG. 2 is a perspective view of the applicant's preferred hot vacuum extrusion apparatus.

With reference now to FIG. 2, an alternative preferred embodiment, generally 11, includes a floor stand 66 on which the extrusion apparatus, generally 68, is mounted. The floor stand 66 has an upper table 70 rotatably secured by means of a hinge 72 to a lower rigid supporting platform 74 at the hinged end 76 of the floor stand 66 adjacent the extrusion end or tool 34 on the extrusion apparatus 68. At the opposing end 78 of the floor stand 66, the upper table 70 rests on the lower support platform 74 but is also rotatable at that end upward, about the hinge 72, when raised by means of a hydraulic lift 80 when the lift 80 is actuated by an operator. The lift 80 allows substantially vertical orientation as suggested in FIG. 1 in order to easily load in ceramic components 54, and/or, more importantly, to extrude the ceramic components 54 at any angle from horizontal to vertical.

The extrusion apparatus 68 of the alternative FIG. 2 embodiment includes two generally parallel press guide bars 77, 79 rigidly mounted on the upper surface of the upper table 70. The guide bars 77, 79 are mounted on opposing sides of, and parallel to, the axis of the ram 20 and bellows 22.

A rectangular steel press guide plate 82 is mounted transverse to the axis of the bellows 22 and the hydraulically driven ram 20. The guide plate 82 is secured to the ram 20 and has two guide apertures 84, 86 on opposing sides, and the guide bars 77, 79 penetrate the guide apertures 84, 86 respectively. The lower planar side 88 of the guide plate 82 sidably abuts the upper surface of the upper table 70. When the ram 20 is actuated toward or away from the heating chamber or kiln 12, the guide plate 82 thus slides along and parallel to both the guide rails 77, 79 and the upper surface of the upper table 70. This novel and economical cooperative arrangement of guide rails 77, 79, upper table 70, and guide plate 82 retains the press arm (26 in FIG. 4) in the proper axial alignment during operation of the extrusion apparatus 68.

In the alternative embodiment of FIG. 2, the external, expandable and contractible outer surface 90 of the bellows 22 is made of rubber or other flexible but relatively non-porous material. One end 95 of the bellows 22 is secured by a peripheral clamp 92 to the outer periphery of a steel support cylinder 94 coaxial with the bellows 22 and extending perpendicularly from, and welded to, the guide plate 82 toward the vacuum chamber 14. The opposing end 96 of the bellows 22 is secured by a peripheral clamp 98 to the outer periphery of the cylindrical vacuum chamber 14.

Figure 4:
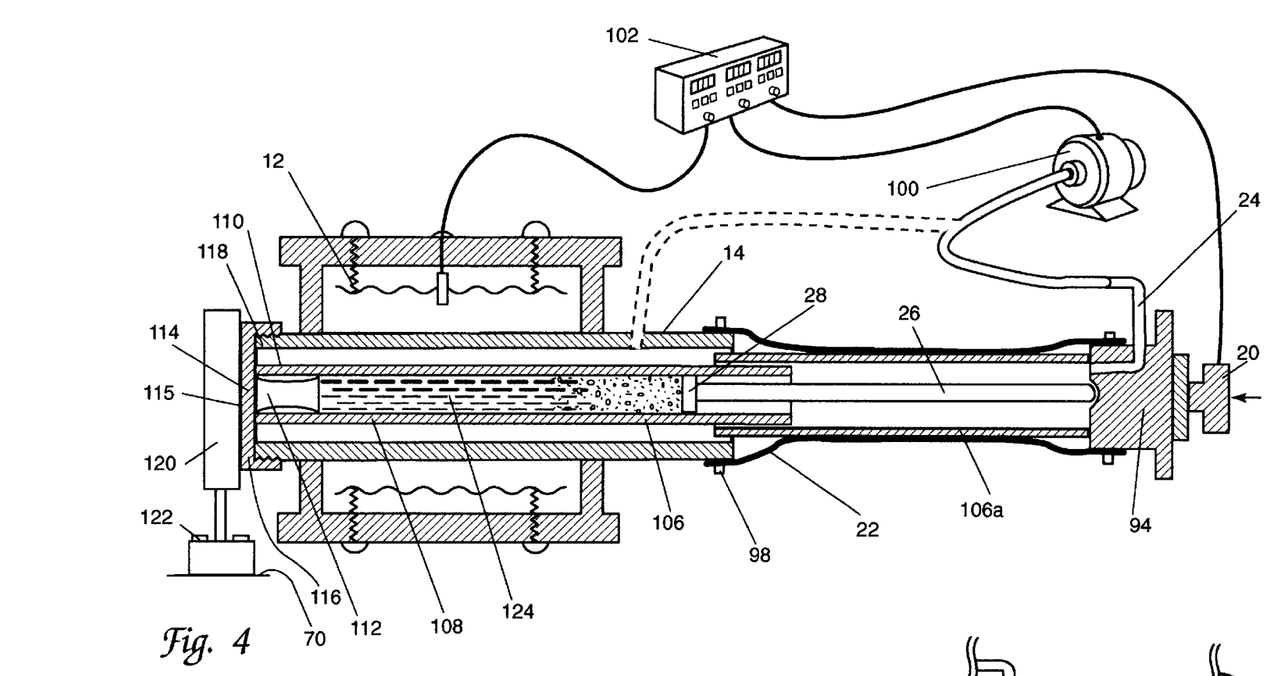
FIGS. 4 and 4a are cross-sectional views of the applicant's preferred hot vacuum extrusion apparatus shown in FIG. 2.
Figure 4A:
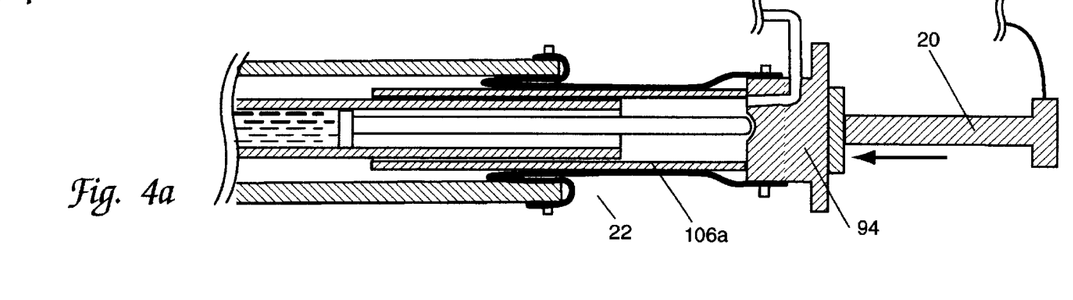
Figure 5:
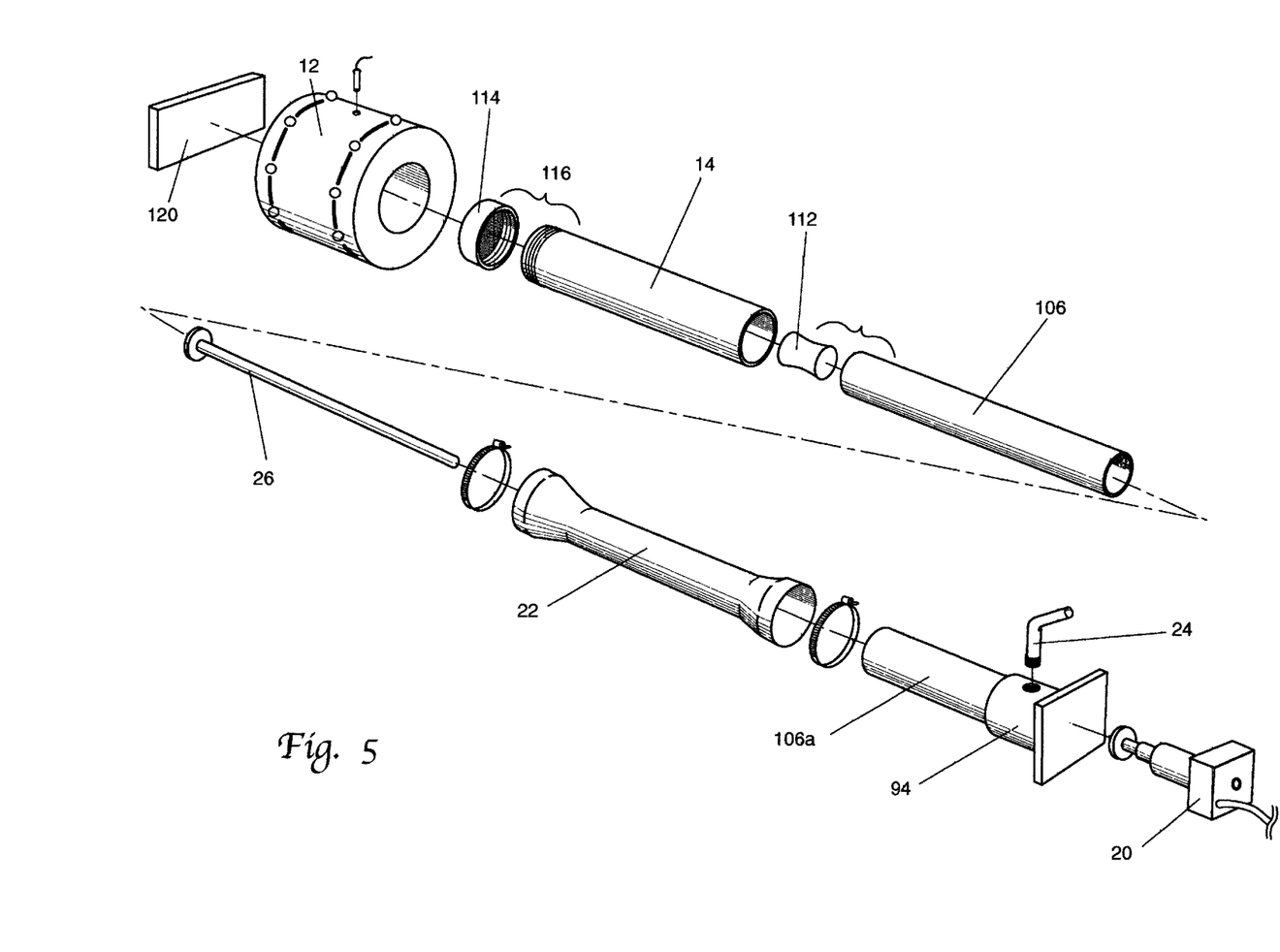
FIG. 5 is a partial exploded perspective view generally of components of the applicant's preferred hot vacuum extrusion apparatus of FIG. 4.

FIGS. 4 and 4A show the bellows 22 in extremes of travel. An elastomeric tube 22 may be bonded and clamped to vacuum chamber 14 and cylinder 94 at extremities of tube 22, although its elasticity alone can provide an adequate seal when carefully chosen. Inner pipe 106 is fixed with respect to cylinder 94. Pipe 106 overlies press face 28. Vacuum suction tends to hold the tube 22 to the inner pipe 106. The tube 22 tends to fold over itself as the press arm 26 advances into pipe 106. FIGS. 4, 4a and 5 show an optional sleeve 106a supported by cylinder 94. Sleeve clears and slides between chambers 14 and 106.

Referring again to FIG. 4, a vacuum pump 100 is connected to the vacuum line 24, and the vacuum line 24 penetrates the steel support cylinder 94. When activated by an operator, the vacuum pump 100 thus draws a vacuum within the interior of the bellows 22 and the interior of the vacuum chamber 14 to which the bellows 22 is sealingly secured by the clamp 98. Shown in phantom in FIG. 4, the vacuum pump 100 can alternatively lead to a vacuum line 24 located directly to vacuum chamber 14.

The vacuum pump 100, the heating element 12, and the hydraulic ram 20 are connected to and controlled by their respective set of controls mounted in a central control box 102. An operator standing at the control box 102 can thus control the temperature of the element 12, the drawing of the vacuum by the vacuum pump 100, and the pressing or withdrawal of the press 26 by the hydraulic ram 20.

Still referring to FIG. 4, the bellows 22 surround the press arm 26, and the press arm 26 slidably penetrates the feed end 106 of the forming chamber 108 within the interior of the vacuum chamber 14. As shown in FIGS. 4 and 5, the press 20 and bellows 22 are coaxial with the axis of the forming chamber 108, the surrounding cylindrical vacuum chamber 14, and the surrounding cylindrical kiln and heating element 12.

Referring to FIG. 4, at the forming end 110 of the forming chamber 108 opposite the feed end 106, a steel forming plug 112 is removably and slidably mounted within the interior of the forming chamber 108, and the forming end 110 and forming plug 112 both abut a removable rear vacuum seal 114 removably threaded into threads 116 formed in the ejection end 108 of the vacuum chamber 14. In turn, the opposing outward side 115 of the seal 114 abuts a rigid steel stop block 120 removably secured by fasteners, e.g., 122, to the upper table 70. Thus, when materials 124 are being pressed, heated, and formed within the forming chamber 108, the plug 112 is secured in position within the forming chamber; and when the stop block 120, seal 114, and plug 112 are removed after the pressing and heating of the materials 124 within the forming chamber 108, the press arm may be hydraulically activated by the operator to press the materials 124 axially through the forming chamber 106 and out the forming end 110 of the forming chamber 108.

Figures 6, 6A:
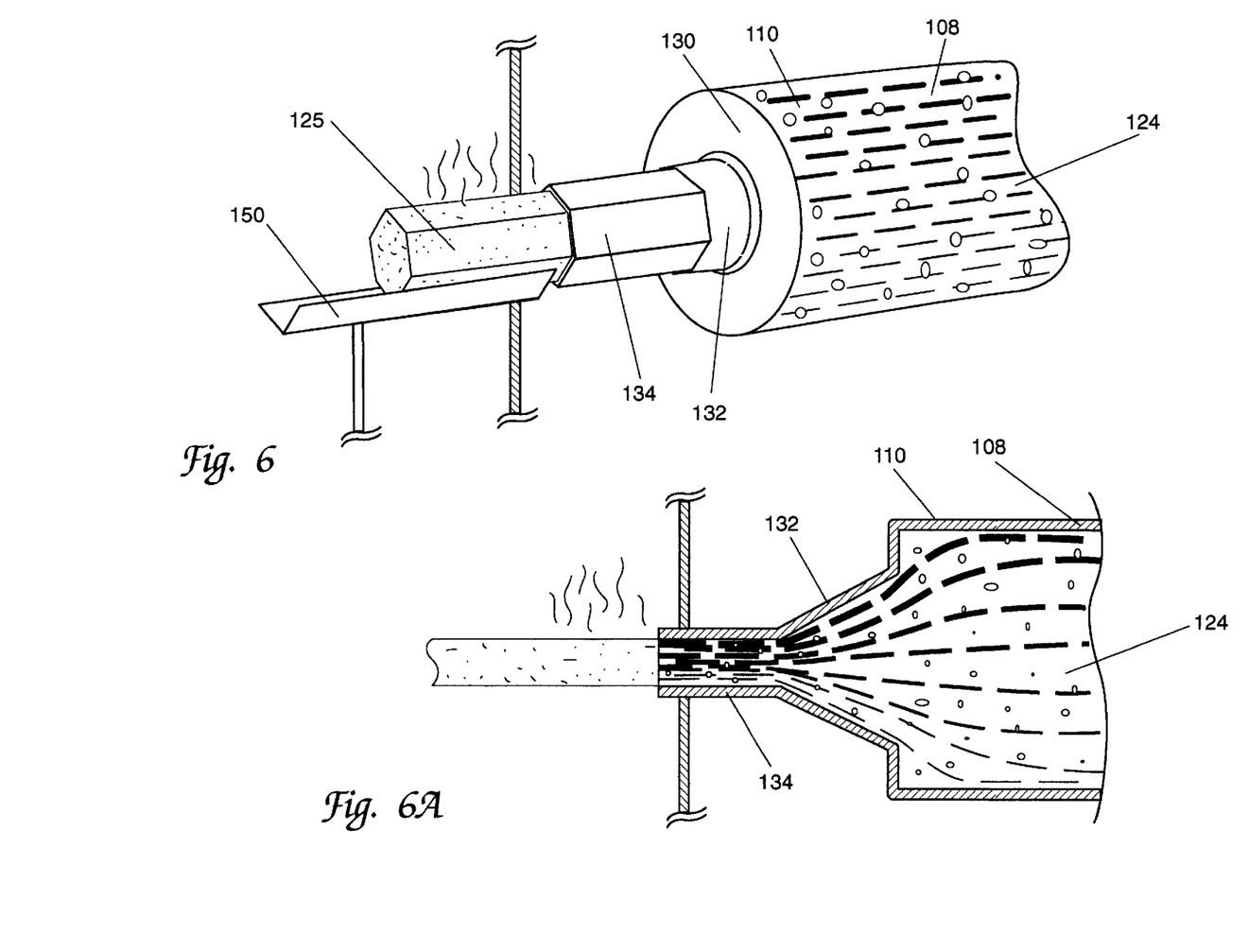
FIGS. 6 and 6A are cross-sectional views of an alternative forming die for use with the present invention.
Figures 7A, 7B, 7C:
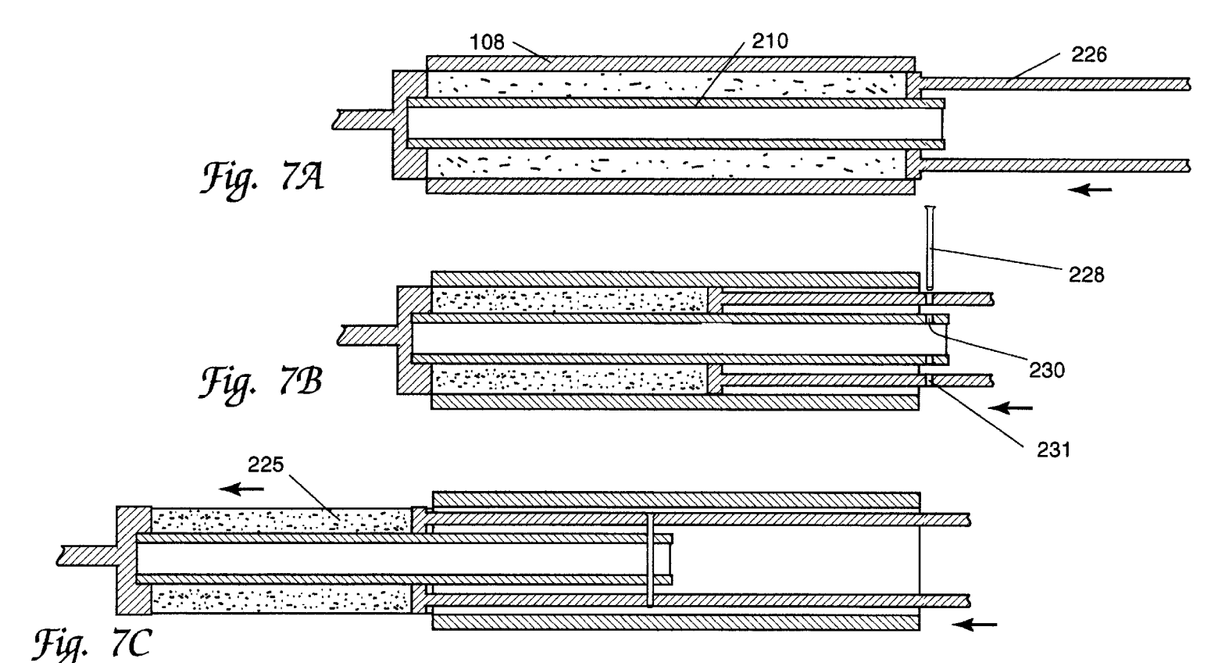
FIGS. 7A, 7B, 7C, and 7D are sectional views similar to FIG. 1 showing how hollow formed articles can be made.
Figure 7D:
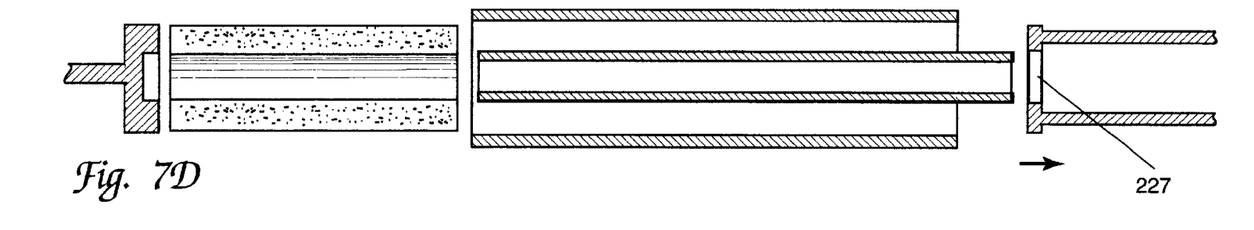

Referring now to FIGS. 6 and 6A, during the extrusion operation, a forming die 130 may be removably mounted on the forming end 110 of the forming chamber 108. The forming die 130 may have a narrowed conical neck section 132 terminating in a yet narrower forming section 134 in the die 130. The structure of the forming die 130 will provide friction and other resistance to the passage of forming material 124 through the die 130; and the die 130 will simultaneously further compress the forming material 124 as it passes through the die 130. Since the portion of the die 130 abutting the forming chamber 108 is somewhat heated by the surrounding kiln due to element 12 as shown in FIG. 2 and compresses and creates friction with the forming material 124 as it passes through the die 130, and forming section 134, the die 130 and especially forming section 134 aids in vitrification of the outer surface of the material 124 as the material 124 passes through the die 130 and forming section 134. Finally, the forming section 134 of the die 130 may be sized (i.e., has a sufficient axial length) so that material 124 being ejected outward of the forming section 134 begins to cool prior to contact with the cooler air outward of the die 130 and forming chamber 108 within the kiln as shown in FIG. 2. As shown in FIGS. 6, the ejected and formed material 125 is preferably supported by a guide tray 150 placed in position outboard of, but adjacent, the forming chamber 108 prior to ejection of the material 125 from the forming chamber 108.

A hollow formed material 225 can be made by using a forming tube 210 in the center of chamber 108, as shown in FIGS. 7A–7D. Press arm 226 has a central hollow 227 to clear around tube 210 and push material 225. The tube 210 locks to arm 226 via a pin 228 passing through holes 231 in arm 226 and holes 230 in tube 210 to extract tube 210.

Figure 3:
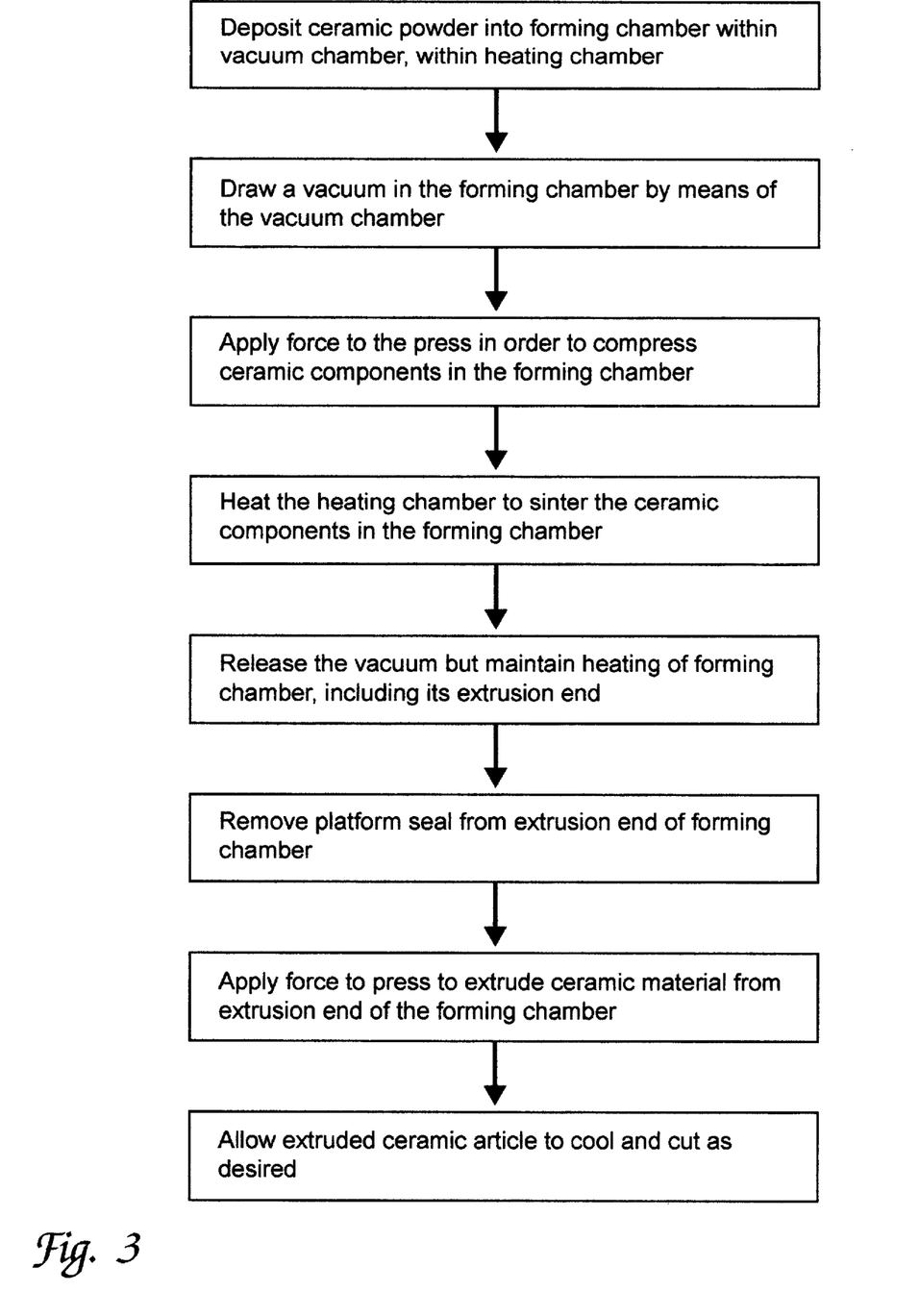
FIG. 3 is a flow chart of the applicant's preferred method for use with the applicant's preferred apparatus of FIGS. 1 and 2.

With reference now to FIG. 3, the preferred method proceeds as follows:

A. in the fashion described above, deposit the ceramic components into the forming chamber, with the extrusion end pre-sealed by the platform seal abutting the extrusion end:

B. draw a vacuum in the forming chamber by means of the vacuum chamber surrounding the forming chamber;

C. while maintaining the vacuum, apply force to the press (such as by activating the hydraulic ram 20 of FIG. 2) in order to force the press face to against the deposited ceramic components and compress the components within the forming chamber;

D. while maintaining the vacuum and pressing force, heat the heating chamber in order to: (i) achieve the temperature required in the forming chamber and thereby fuse or sinter the ceramic components; and (ii) heat the extrusion end of the chamber to the desired temperature to accomplish the desired vitrification, or further vitrification, of the ceramic material when later extruded through the extrusion end;

E. release the vacuum;

F. release the clamp so that the platform seal can be removed from the extrusion end of the forming chamber;

G. with the forming chamber remaining in position within the vacuum chamber, apply further force to the press so that the press face presses the sintered ceramic material to extrude through the extrusion end and thus attain the desired shape and, if desired, vitrification or further vitrification of the external surface of the ceramic material that comes into contact with the extrusion end during this extrusion step;

H. allow the extruded ceramic material to cool, and if desired, cut into smaller sections in a manner well known to those skilled in the art.

When the ceramic component material is muscovite mica, the heating temperature utilized in the preferred method may be as high as 1250–1320 degrees Celsius. The application of the vacuum prior to fusing of the mica by heating renders the resulting product significantly less porous and stronger; and the application of pressure by the press renders the resulting product even more solid, impermeable, and strong. In addition, the utilization of the vacuum and the press in the present method allows for use of lower temperatures to achieve the desired sintering, structural integrity, and strength of the resulting ceramic product.

Figure 8:
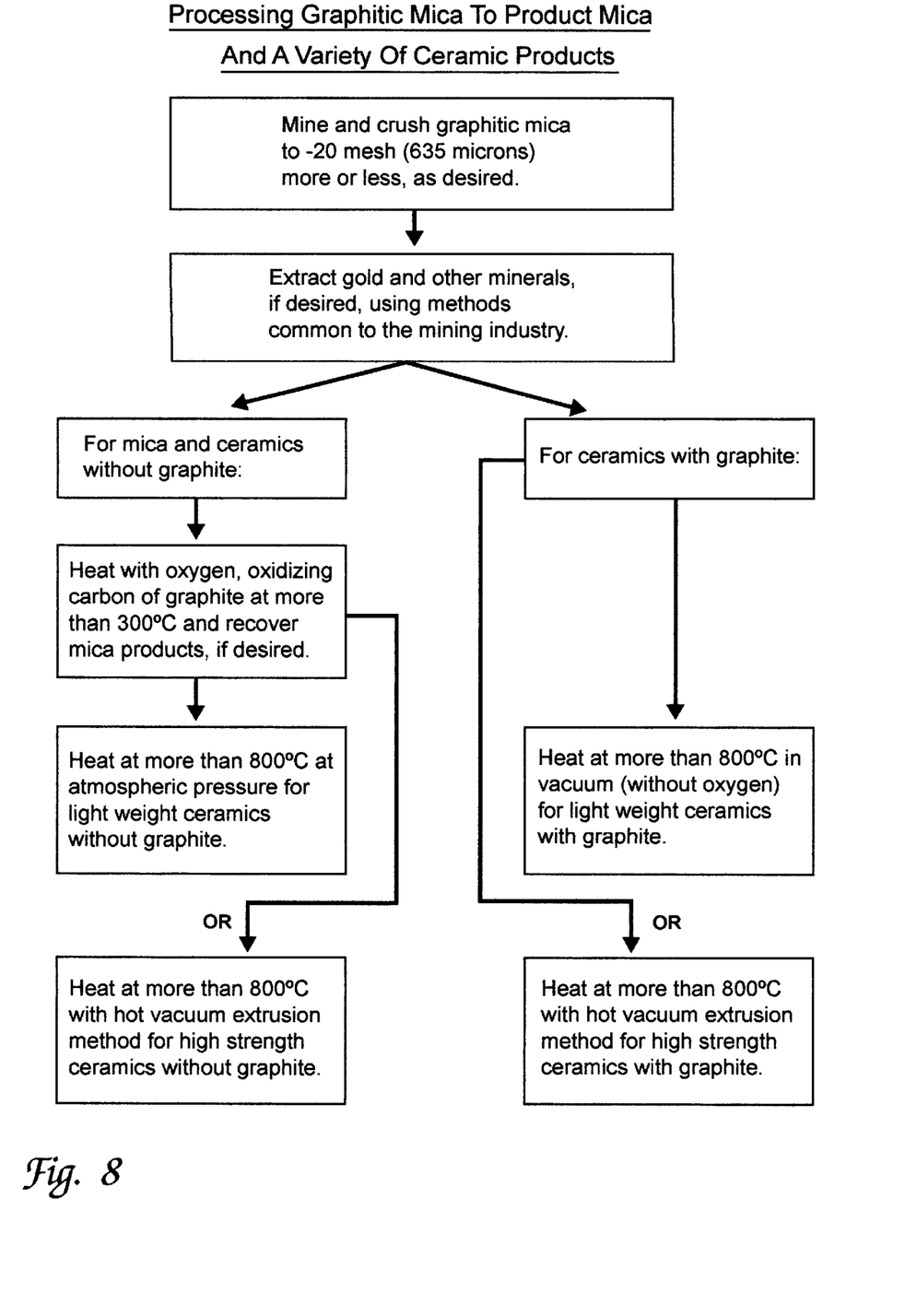
FIG. 8 is a flow chart showing the processing graphitic mica to produce mica and a variety of ceramic products.

In this regard, the maintenance of the vacuum during the heating step can also reduce the amount of oxidation of minerals (such as graphite) within the mica matrix and can increase the variety or level of crystallization in the resulting product (such as by crystallization of silicon carbide within the sintered mica). The resulting ceramic product is therefore harder and stronger and has a higher fusing point. Additionally, under a vacuum, varying the degree of heat and ram pressure during the process with graphite present, can significantly alter the final product, as needed, in regard to its magnetic and electrical properties. There exists throughout the world sizable natural bodies of graphitic mica, also known as graphitic schist. These rocks generally consist of a few percent of graphite within the matrixes of fine grained (generally muscovite) mica and have had no significant economic uses. Efforts to separate the potentially valuable mica from the graphite have been unsuccessful. However, the claimant has discovered processes to economically use the graphitic mica, as shown in FIG. 8. The graphitic mica material is first crushed, then when it is heated to above 300 degrees C. with air, any graphite will start to oxidize, and prior to the complete destruction of mica, will produce various grades of economical graphite-free mica. When the muscovite mica is heated to 400–500 degrees C., the crystalline structure starts to change, and then evolves water at 500–700 degrees C., and at 940–1200 degrees C., it changes to alumina, mullite, and a glass and which can fuse into a valuable ceramic, even without pressure. At about 1250–1320 degrees C., (or at lower temperatures with the hot vacuum extrusion method), the mica ceramic product will fuse into an impermeable state presenting a more valuable ceramic with increased strength. Mica minerals with graphite, other than muscovite mica, can be processed in the same manner, but at generally higher temperatures.

When the graphitic mica is heated, as in the above paragraph, but in a vacuum or in an atmosphere without oxygen, the resulting ceramic will retain the graphite in various forms (in the matrix of the ceramic product) including graphite, silicon carbide, and other crystal forms, and will develop magnetic and electrical properties. This process gives the product added hardness and strength, with a higher fusing point. Additionally, if the foregoing is accomplished with a ram pressure (with the hot vacuum extrusion method), the ceramic will become impermeable and much stronger, even at lower temperatures.

The ceramic products processed from graphitic mica (which previously had no significant value), as described above, can be made into a wide variety of ceramic products including bricks, roofing tiles, floor tiles, bearing walls, and pipes. In addition to the ceramic products described above, when made in a vacuum or in an atmosphere without oxygen, the graphitic mica can be made into grinding tools, cutting and scraping tools, and when subjected to the vacuum hot press extrusion method, it produces high strength ceramics, and achieves degrees of magnetic and electrical conductivity which allows it to replace heavier more expensive metals having a variety of well known useful magnetic and electrical properties. As described above, if the graphite is oxidized, prior to fusing the resulting graphite-free mica, the mica product can be economically used as a filler and extender in gypsum plasterboard cements, as a pigment extender in paints, as a filler in the plastics and tire industries, as well as other uses where ground mica is commonly used.

As also noted above, when the heated ceramic material is extruded through the hot extrusion end, the surface of the sintered ceramic material can be vitrified, or further vitrified, in order to achieve an attractive, harder, and highly impermeable glaze-like surface on the extruded ceramic product.

It can thus be seen that the applicant's preferred embodiment, provides a unique and streamlined method and apparatus for hot manufacturing and hot extrusion of ceramic articles under pressure. The applicant's most preferred method and apparatus do not require removal or opening of canisters or other containers used to pack or form the ceramic components that are formed into ceramic articles of manufacture. The most preferred method and apparatus also require no clamping or dismantling of any mold. They accomplish pressing of the entire ceramic article being heated within the apparatus, and they do not require use of binding agents or wet plastic clay. They can enhance vitrification of the outer surface of the ceramic article being manufactured; and they render the resulting ceramic article denser, stronger, more homogenous, and economical. They also make removal of the sintered ceramic article relatively easy, through the internal extrusion process.

The foregoing is a detailed description of the applicant's preferred embodiment. The scope of the present invention, however, is to be determined by reference to the accompanying claims.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. An apparatus for extrusion manufacturing ceramic articles from ceramic component materials, the apparatus comprising in combination:
   (A) a heating element;
   (B) a vacuum chamber being mounted adjacent the heating element whereby the heating element heats at least a portion of the vacuum chamber;
   (C) a ceramic forming chamber portion located within the vacuum chamber portion, the ceramic forming chamber having an extrusion member; and
   (D) a ceramic press movably penetrating the ceramic forming chamber portion whereby ceramic component materials are heated and pressed within the ceramic forming chamber portion and extruded out of the ceramic forming chamber portion through the extrusion member wherein (i) the ceramic forming chamber portion has a press aperture, (ii) the vacuum chamber has a bellows section opposite an openable sealing member and formed from flexible, non-porous material, and (iii) the ceramic press has a press arm mounted within the bellows section to slidably move within the bellows section and penetrate the press aperture, to thereby press the ceramic component materials within the ceramic forming chamber portion.

2. The ceramic manufacturing apparatus of claim 1 also having a press platform removably mountable within the confines of the vacuum chamber in order to seal and support the extrusion member during pressing and pre-extrusion heating of the ceramic components materials within the ceramic forming chamber portion.

3. The ceramic manufacturing apparatus of claim 1 in which the bellows section is mounted adjacent a press end of the ceramic forming chamber portion and the apparatus also has a press platform removably mountable opposite the press end of the ceramic forming chamber portion and within the confines of the vacuum chamber in order to seal and support the extrusion member during pressing and pre-extrusion heating of the ceramic components materials within the ceramic forming chamber portion.

4. An apparatus for extrusion manufacturing ceramic articles from particulate ceramic components, the apparatus comprising in combination:
   (A) a heating chamber;
   (B) a vacuum chamber having a first end mounted within the heating chamber whereby the heating chamber surrounds and heats a substantial portion of the vacuum chamber;
   (C) a ceramic forming chamber having a press end opposite an extrusion end and an axial length spanning between the press end and the extrusion end, the ceramic forming chamber being mounted within and enclosed by the vacuum chamber so that the axial length of the ceramic forming chamber is substantially surrounded by the heating chamber; and (D) a ceramic press slidably penetrating the press end of the ceramic forming chamber whereby the particulate ceramic components are heated and fused within the confines of the ceramic forming chamber and extruded out of the ceramic forming chamber through the extrusion end and the vacuum chamber.

5. The ceramic manufacturing apparatus of claim 4 wherein (i) the ceramic forming chamber has a press aperture penetrating the press end of the ceramic forming chamber, (ii) the vacuum chamber has a bellows section, and (iii) the ceramic press has a press arm mounted within the bellows section to slidably move within the bellows section and penetrate the press aperture, to thereby press and form the particulate ceramic components within the ceramic forming chamber.

6. The ceramic manufacturing apparatus of claim 5 also having a press platform removably mounted within the confines of the vacuum chamber in order to seal and support the extrusion end of the ceramic forming chamber during pressing and pre-extrusion heating of the particulate ceramic components within the ceramic forming chamber.

7. The ceramic manufacturing apparatus of claim 6 also having a press platform removably mountable opposite the press end of the ceramic forming chamber and within the confines of the vacuum chamber in order to seal and support the extrusion end during pressing and pre-extrusion heating of the particulate ceramic components within the ceramic forming chamber.

8. The ceramic manufacturing apparatus of claim 1 wherein (i) the ceramic forming chamber portion has a press aperture, (ii) the vacuum chamber has an elastomeric tube section opposite an openable sealing member and defining said bellows section, and (iii) the ceramic press has a press arm mounted within the elastomeric tube section to slidably move within the elastomeric tube section and penetrate the press aperture, to thereby press the ceramic component materials within the ceramic forming chamber portion, said elastomeric tube section folds and unfolds over itself as the press arm moves.

9. An apparatus for extrusion manufacturing ceramic articles from particulate ceramic components, the apparatus comprising, in combination:

a heating chamber;

means for retarding oxidation of the ceramic component material;

a ceramic forming chamber having a press end and an extrusion end, said ceramic forming chamber disposed within said heating chamber such that said press end extends out from said heating chamber and said oxidation retarding means couples to said press end; and a press slidably penetrating the press end of the ceramic forming chamber whereby the particulate ceramic components are heated and fused within the confines of the ceramic forming chamber and extruded out of the ceramic forming chamber through the extrusion end of the ceramic forming chamber, said press having an extremity remote from said press end coupled to said oxidation retarding means.

10. The apparatus of claim 1 wherein said bellows section is formed from rubber.

11. The apparatus of claim 9 wherein said oxidation retarding means compress a resilient elastomeric sleeve sealed to said press end and sealed to said press at said remote extremity.

12. The apparatus of claim 11 wherein said sleeve has an interior which receives a vacuum to retard oxidation and said sleeve folds and unfolds over itself during motion of said press.

* * * * *